United States Patent
Flautner et al.

(10) Patent No.: US 7,321,942 B2
(45) Date of Patent: Jan. 22, 2008

(54) PERFORMANCE COUNTER FOR ADDING VARIABLE WORK INCREMENT VALUE THAT IS DEPENDENT UPON CLOCK FREQUENCY

(75) Inventors: Krisztian Flautner, Cambridge (GB); Trevor Nigel Mudge, Ann Arbor, MI (US); David Walter Flynn, Cambridge (GB)

(73) Assignees: ARM Limited, Cambridge (GB); University of Michigan, Ann Arbor, MI (US)

( * ) Notice: Subject to any disclaimer, the term of this patent is extended or adjusted under 35 U.S.C. 154(b) by 415 days.

(21) Appl. No.: 10/687,924

(22) Filed: Oct. 20, 2003

(65) Prior Publication Data

US 2005/0097228 A1    May 5, 2005

(30) Foreign Application Priority Data

| Nov. 12, 2002 | (GB) | ................................ 0226395.2 |
| Dec. 6, 2002 | (GB) | ................................ 0228549.2 |
| Mar. 10, 2003 | (GB) | ................................ 0305437.6 |

(51) Int. Cl.
   *G06F 3/00* (2006.01)

(52) U.S. Cl. ........................................ 710/15; 700/108
(58) Field of Classification Search ........ 713/320–322; 702/182, 183; 710/15; 700/108
See application file for complete search history.

(56) References Cited

U.S. PATENT DOCUMENTS

| 5,446,876 | A | * | 8/1995 | Levine et al. .................. 714/47 |
| 5,627,412 | A | | 5/1997 | Beard ........................... 307/82 |
| 5,671,402 | A | | 9/1997 | Nasu et al. .................. 712/227 |
| 5,734,585 | A | | 3/1998 | Beard ......................... 700/286 |
| 6,460,107 | B1 | * | 10/2002 | Rao et al. .................... 710/305 |
| 6,633,988 | B2 | * | 10/2003 | Watts et al. ................. 713/322 |
| 6,829,713 | B2 | * | 12/2004 | Cooper et al. .............. 713/320 |
| 6,901,524 | B2 | * | 5/2005 | Watts, Jr. .................... 713/322 |
| 2002/0087901 | A1 | | 7/2002 | Cooper et al. ................ 331/46 |
| 2002/0183972 | A1 | * | 12/2002 | Enck et al. .................. 702/186 |

* cited by examiner

*Primary Examiner*—Donald Sparks
*Assistant Examiner*—Harold Kim
(74) *Attorney, Agent, or Firm*—Nixon & Vanderhye P.C.

(57) ABSTRACT

A performance counter accumulates a value by periodically adding a variable increment value representing the amount of work performed. The increment value can be varied in dependence upon the processor clock frequency and may be adjusted under hardware and/or software control.

12 Claims, 13 Drawing Sheets

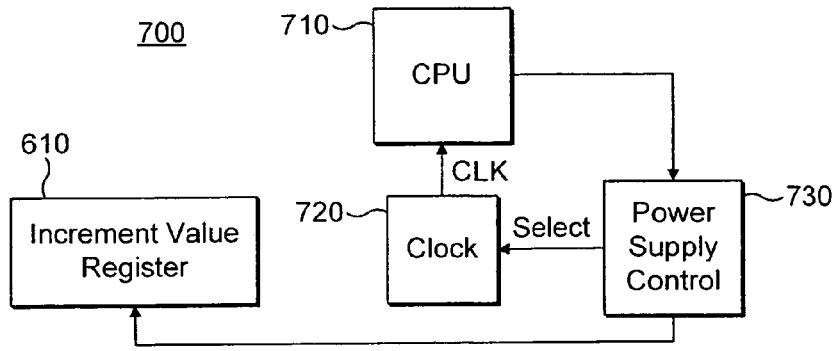

FIG. 7

| | | Execution Statistics | | | MPEG Decode | |
|---|---|---|---|---|---|---|
| | | Length(s) | Idle | Sleep | Ahead(s) | Exactly On Time |
| Danse De Cable | LongRun | 247.1 | 54% | 23% | 148.10 | 6 |
| 320x160 +audio | Present Technique | | 27% | 4% | 68.74 | 1012 |
| Legendary | LongRun | 19.4 | 33% | 13% | 7.20 | 19 |
| 352x240 +audio | Present Technique | | 24% | 7% | 4.79 | 65 |
| Red's Nightmare | LongRun | 49.1 | 48% | 36% | 26.31 | 5 |
| 320x240 | Present Technique | | 32% | 13% | 16.53 | 74 |
| Red's Nightmare | LongRun | 49.3 | 22% | 15% | 12.48 | 87 |
| 480x360 | Present Technique | | 18% | 11% | 8.17 | 139 |
| Roadkill Turtle | LongRun | 121.3 | 46% | 19% | 64.93 | 5 |
| 304x240 +audio | Present Technique | | 25% | 4% | 33.34 | 237 |
| Sentinel | LongRun | 35.6 | 28% | 10% | 11.05 | 80 |
| 320x240 +audio | Present Technique | | 19% | 5% | 6.32 | 231 |
| SpecialOps | LongRun | 60.8 | 30% | 11% | 19.01 | 129 |
| 320x240 +audio | Present Technique | | 20% | 5% | 12.67 | 305 |

FIG. 8

| | LongRun | | | | | Present Technique | | | | | Mean Performance Reduction Over LongRun |
|---|---|---|---|---|---|---|---|---|---|---|---|
| | Fraction Of Time At Each Performance Level (Mhz) | | | | Mean Perf Level | Fraction Of Time At Each Performance Level (Mhz) | | | | Mean Perf Level | |
| | 300 | 400 | 500 | 600 | | 300 | 400 | 500 | 600 | | |
| Danse De Cable | 6% | 19% | 33% | 54% | 89% | 51% | 48% | 0% | 0% | 59% | 34% |
| Legendary | 0% | 3% | 17% | 79% | 96% | 0% | 8% | 88% | 4% | 82% | 15% |
| Red's Nightmare Small | 11% | 35% | 35% | 19% | 80% | 95% | 2% | 0% | 3% | 52% | 35% |
| Red's Nightmare Big | 0% | 5% | 21% | 74% | 95% | 0% | 0% | 90% | 10% | 85% | 11% |
| Roadkill Turtle | 3% | 10% | 23% | 64% | 92% | 1% | 97% | 1% | 0% | 66% | 28% |
| Sentinel | 0% | 0% | 14% | 86% | 97% | 0% | 0% | 93% | 7% | 84% | 13% |
| SpecialOps | 1% | 2% | 14% | 83% | 96% | 0% | 2% | 93% | 4% | 83% | 14% |

FIG. 9

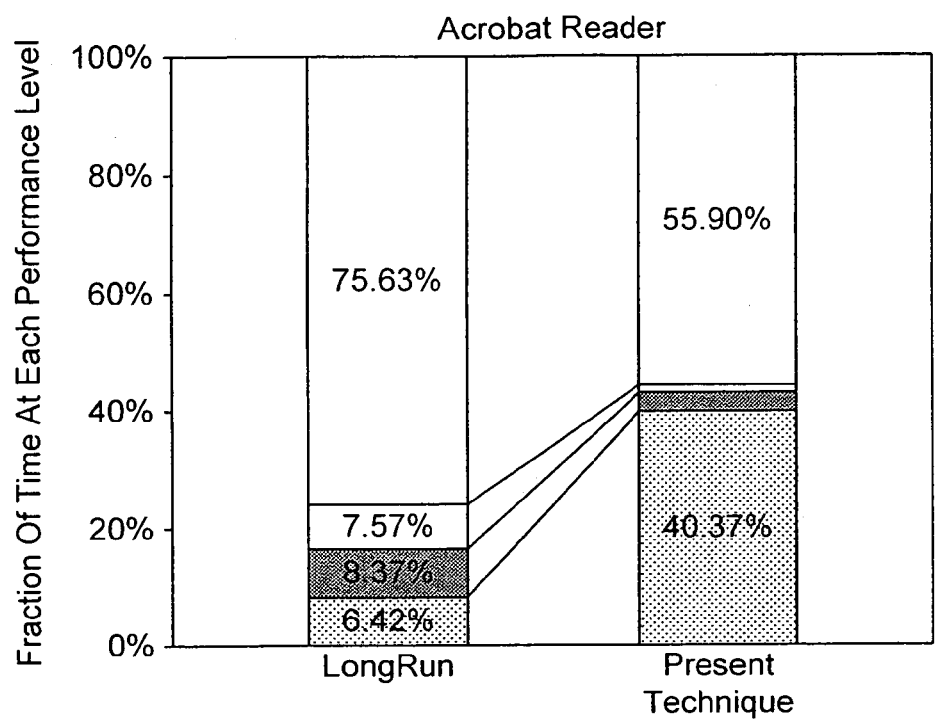
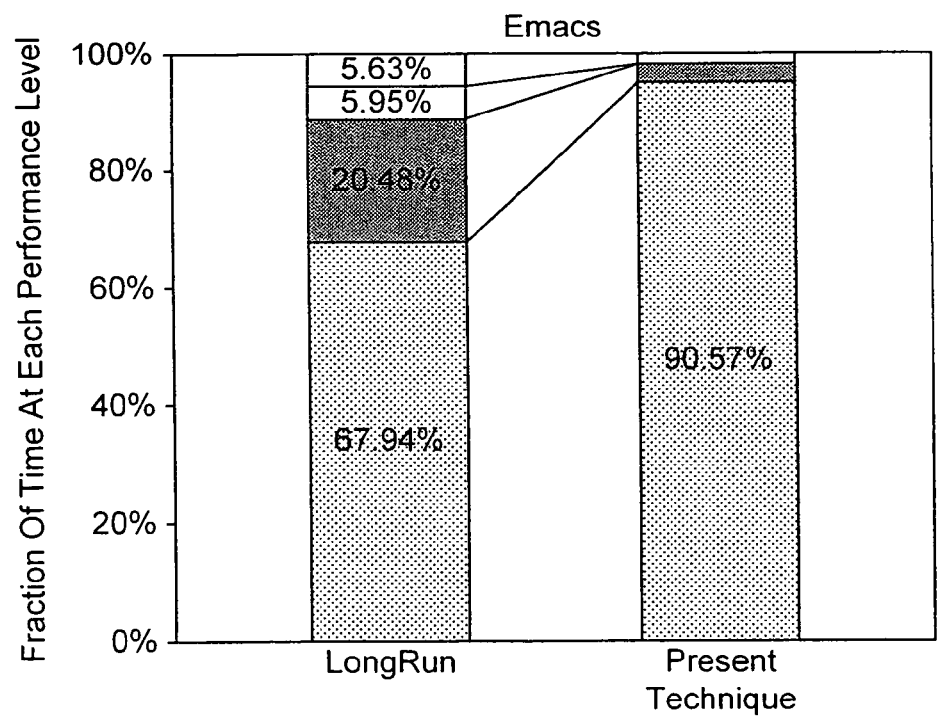
FIG. 13

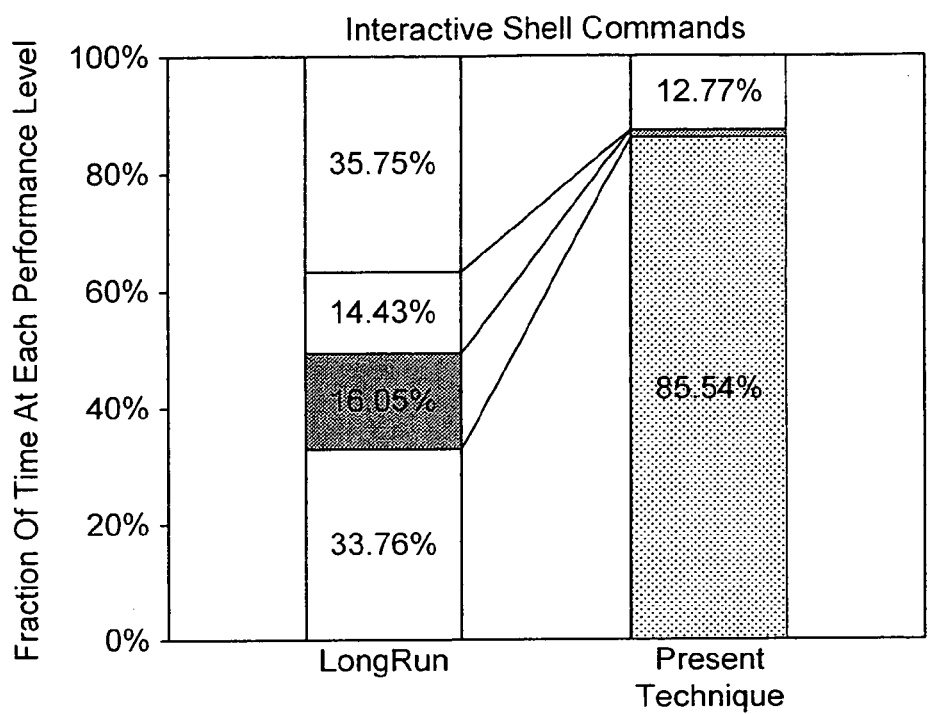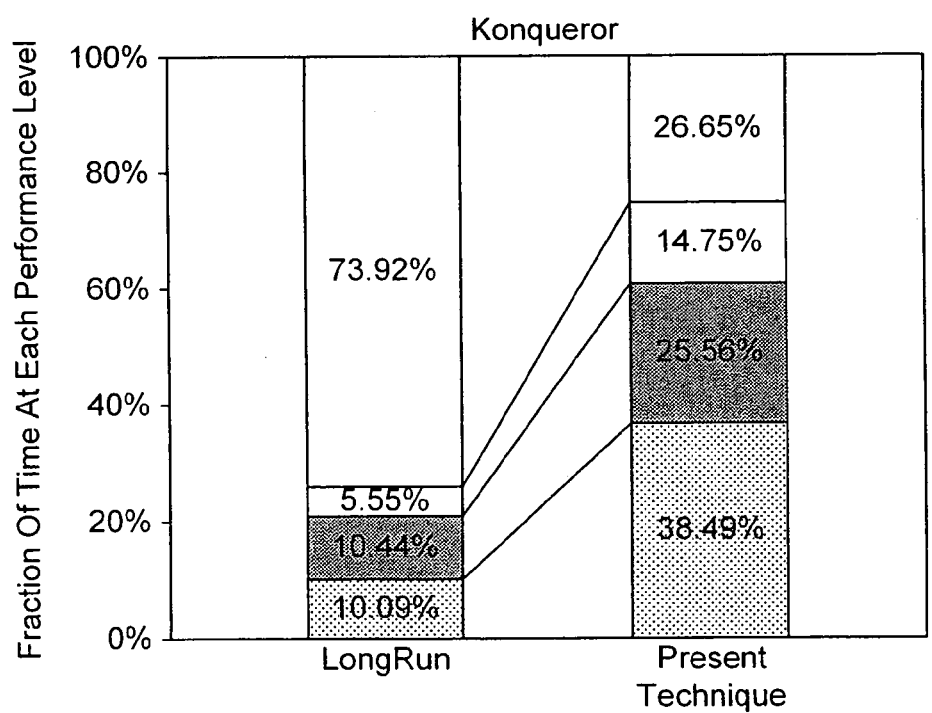
FIG. 13 CONT'D

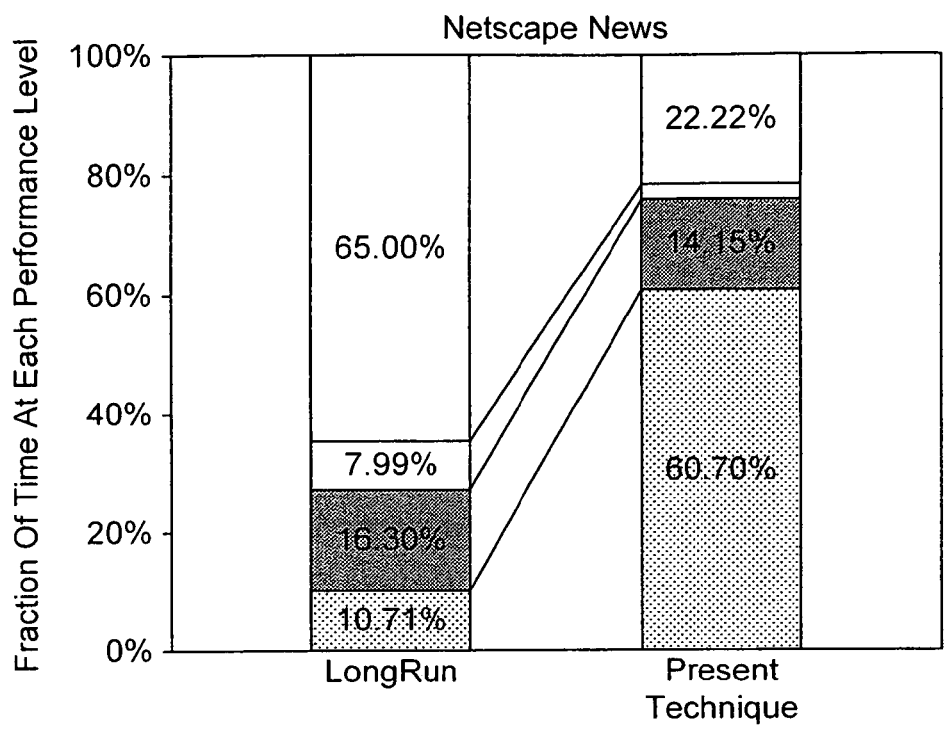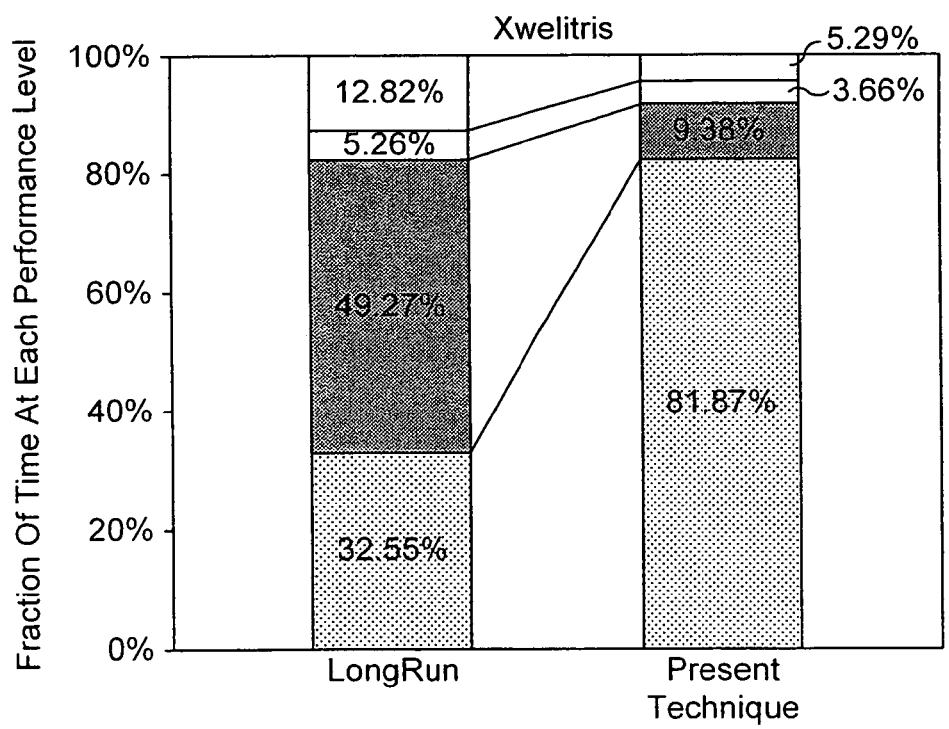
FIG. 13 CONT'D

PERFORMANCE COUNTER FOR ADDING VARIABLE WORK INCREMENT VALUE THAT IS DEPENDENT UPON CLOCK FREQUENCY

The U.S. Government has a paid-up license in this invention and the right in limited circumstances to require the patent owner to license others on reasonable terms as provided for by the terms of F33615-00-C-1678 awarded by Defense Advanced Research Projects Agency.

BACKGROUND OF THE INVENTION

1. Field of the Invention

This invention relates to data processing systems. More particularly, this invention relates to performance counters in data processing systems.

2. Description of the Prior Art

In order to monitor and/or control the performance level within a data processing system it is desirable to have a performance counter. It is known to provide performance counters that count the number of processing cycles executed by a processor. Such performance counters do not readily combine with information concerning real time as the count rate will vary with the processing clock speed selected without a ready indication of whether a desired amount of processing has been done within a desired amount of time.

It is also known to provide real time clocks which operate by steadily incrementing a count value under control of a fixed clock frequency to keep track of the passage of time. Such real time clocks do not provide an indication of the number of processing cycles that may or may not have been performed in a given period of time dependent upon the particular clock frequency for the processor being used at that time.

It would be desirable to provide a performance counter that was able to take account of different processing clock signals that may be selected at different times and yet provide real time based performance information.

SUMMARY OF THE INVENTION

Viewed from one aspect the present invention provides apparatus for processing data, said apparatus being operable to perform processing work at a variable rate of work and comprising:

a performance counter operable to add a work increment value to an accumulated work done value to accumulate a work done value indicative of an amount of processing work performed by said apparatus; wherein said work increment value is variable so as to represent said variable rate of work.

The invention provides a performance calculator which steadily accumulates a work done value by adding a variable work increment value representing the amount of processing work done since the last work increment value was added. Thus, by varying the work increment value the system can take account of the different amount of work that may be performed in a unit of time depending upon the particular status of the system, such as the clock speed being used, the memory performance characteristics at that clock speed and the like. In addition, the adding of the increment value can be performed at regular intervals thereby providing a real time basis for the performance measurement and the measurement of processing work actually done.

Preferred embodiments of the invention operate in systems in which the processing clock frequency can vary and in such systems the increment value is varied in dependence upon the processing clock frequency (possibly with a non-linear dependence between the processing clock frequency and the increment value).

Preferred embodiments provide a power supply that operates to supply a plurality of different voltage levels each corresponding to a respective performance level that can be tracked by the performance counter.

More particularly, in preferred embodiments the voltage level can alter the processor clock frequency and the maximum processor clock frequency in turn alter the increment value being used in a manner such that the amount of work done (processing cycles clocked at a first approximation) can be tracked.

The increment value may be controlled by hardware, such as a clock signal selector, a voltage selector or the like and/or may be programmably controlled by software. This control of the increment value provides for a low-overhead way of adjusting the increment value to accurately reflect the current performance level by using a hardware adjustment mechanism and yet also allows software control of the increment value to be made when desired in dependence upon possibly more sophisticated algorithms that are better performed in software. The modification made can be of a read-modify-write form such that the adjustments made by other processes will not be simply overwritten.

The increment value may be provided in the form of a configuration register which may be written both under software and hardware control or possibly in the form of a direct memory map storage location which can similarly be written under hardware and/or software control.

Viewed from another aspect the present invention provides a method of measuring processing work performed by an apparatus for processing data at a variable rate of work, said method comprising the steps of:

adding a work increment value to an accumulated work done value with a performance counter to accumulate a work done value indicative of an amount of processing work performed by said apparatus; and varying said work increment value so as to represent said variable rate of work.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 schematically illustrates an apparatus that is capable of providing a number of different fixed performance-levels in dependence upon workload characteristics;

FIG. 8 is a table that details simulation measurement results for a 'plaympeg' video player playing a variety of MPEG videos;

FIG. 9 is a table that lists processor performance levels statistics during the runs of each workload;

FIG. 13 schematically illustrates statistics gathered using a time-skew correction technique.

DESCRIPTION OF THE PREFERRED EMBODIMENTS

Figure 1:
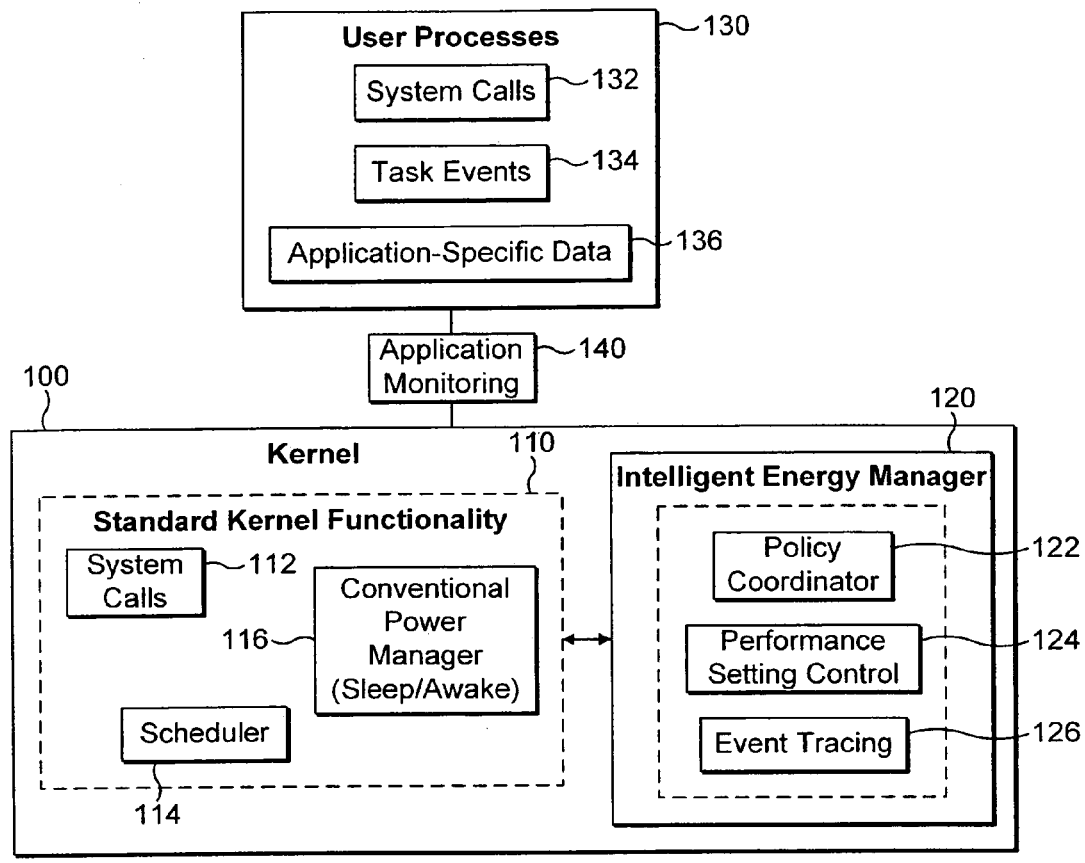
FIG. 1 schematically illustrates how a power management system according to the present technique may be implemented in a data processing system.

FIG. 1 schematically illustrates how the power management system may be implemented in a data processing system. The data processing system comprises a kernel 100 having standard kernel functional modules including a system calls module 112, a scheduler 114 and a conventional power manager 116. An intelligent energy manager system 120 is implemented in the kernel and comprises a policy co-ordinator 122, a performance setting control module 124 and an event-tracing module 126. A user processes layer 130 comprises a system calls module 132, a task management module 134 and application specific data 136. The user processes layer 130 supplies information to the kernel 100 via an application-monitoring module 140.

The kernel 100 is the core that provides basic services for other parts of the operating system. The kernel can be contrasted with the shell, which is the outermost part of the operating system that interacts with user commands. The code of the kernel is executed with complete access privileges for physical resources, such as memory, on its host system. The services of the kernel are requested by other parts of the system or by an application program through a set of program interfaces known as system call. Both the user process layer and the kernel have system calls modules 112, 132. The scheduler 114 determines which programs share the kernel's processing time and in what order. A supervisor (not shown) within the kernel gives use of the processor to each process at the scheduled time. The conventional power manager 116 manages the supply voltage by switching the processor between a power-conserving sleep mode and a standard awake-mode in dependence upon the level of processor utilisation.

The intelligent energy manager 120 is responsible for calculating and setting processor performance targets. Rather than relying only on sleep mode for power conservation, the intelligent energy manager 120 allows the central processing unit (CPU) operating voltage and the processor clock frequency to be reduced without causing the application software to miss process (i.e. task) deadlines. When the CPU is running at full capacity many processing tasks will be completed in advance of their deadlines whereupon the processor will idle until the next scheduled task is begun. An example of a task deadline for a task that produces data is the point at which the produced data is required by another task. The deadline for an interactive task would be the perception threshold of the user (50-100 ms). Going at full performance and then idling is less energy-efficient than completing the task more slowly so that the deadline is met more exactly. When the processor frequency is reduced, the voltage may be scaled down in order to achieve energy savings. For processors implemented in complementary metal-oxide semiconductor (CMOS) technology the energy used for a given workload is proportional to the voltage squared. The policy co-ordinator manages multiple performance-setting algorithms, each being appropriate to different run-time situations. The most suitable performance-setting algorithm to a given condition is selected at run-time. The performance setting control module 124 receives the results of each performance-setting algorithm and repeatedly calculates a target processor performance by prioritising these results. The event tracing module 126 monitors system events both in the kernel 110 and in the user process layer 130 and feeds the information gathered to the performance setting control module 124 and the policy co-ordinator 122.

In the user processes layer, processing work is monitored via: system call events 132; processing task events 134 including task switching, task creation and task exit events; and via application-specific data. The intelligent energy manager 120 is implemented as a set of kernel modules and patches that hook into the standard kernel functional modules and serve to control the speed and voltage levels of the processor. The way in which the intelligent energy manager 120 is implemented makes it relatively autonomous from other modules in the kernel 100. This has the advantage of making the performance setting control mechanism less intrusive to the host operating system. Implementation in the kernel also means that user application programs need not be modified. Accordingly, the intelligent energy manager 120 co-exists with the system calls module 112, the scheduler 114 and the conventional power manager 116 of the kernel, although it may require certain hooks within these subsystems. The intelligent energy manager 120 is used to derive task deadlines and task classification information (e.g. whether the task associated with an interactive application) from the OS kernel by examining the communication patterns between the executing tasks. It also serves to monitor which system calls are accessed by each task and how data flows between the communication structures in the kernel.

Figure 2:
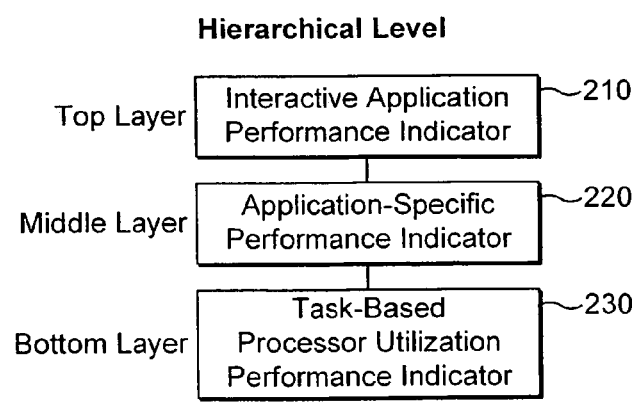
FIG. 2 schematically illustrates three hierarchical layers of the performance setting algorithm according to the present technique.

FIG. 2 schematically illustrates three hierarchical layers of the performance setting algorithm according to the present technique. It should be noted that on a given processor, the frequency/voltage setting options are typically discrete rather than continuous. Accordingly the target processor performance level must be chosen from a fixed set of predetermined values. Whereas known techniques of calculating a target processor performance level involve use of a single performance-setting algorithm, the present technique utilises multiple algorithms each of which have different characteristics appropriate to different run-time situations. The most applicable algorithm to a given processing situation is selected at run-time. The policy co-ordinator module 122 co-ordinates the performance setting algorithms and by connecting to hooks in the standard kernel 110, provides shared functionality to the multiple performance setting algorithms. The results of the multiple performance-setting algorithms are collated and analysed to determine a global estimate for a target processor performance level. The various algorithms are organised into a decision hierarchy (or algorithm stack) in which the performance level indicators output by algorithms at upper (more dominant) levels of the hierarchy have the right to override the performance level indicators output by algorithms at lower (less dominant) levels of the hierarchy. The example embodiment of FIG. 2 has three hierarchical levels. At the uppermost level of the hierarchy there is an interactive application performance indicator 210, at the middle level there is an application-specific performance indicator 220 and at the lowermost level of the hierarchy there is a task-based processor utilisation performance indicator 230.

The interactive application performance indicator 210 calculation is performed by an algorithm based on that described in Flautner et. Al. "Automatic Performance-setting for Dynamic Voltage Scaling", *Proceedings of the International Conference on Mobile Computing and Networking*, July 2001. The interactive application performance-level prediction algorithm seeks to provide guarantees good interactive performance by finding the periods of execution that directly impact the user experience and ensuring that these episodes complete without undue delay. The algorithm uses a relatively simple technique for automatically isolating interactive episodes. This technique relies on monitoring communication from the X server, which is the GUI controller, and tracking the execution of the tasks that get triggered as a result.

The beginning of an interactive episode (which typically comprises a multiplicity of tasks) is initiated by the user and is signified by a GUI event, such as pressing a mouse button or a key on the keyboard. As a result this event, the GUI controller (X server in this case) dispatches a message to the task that is responsible for handling the event. By monitoring the appropriate system calls (various versions of read, write, and select), the intelligent energy manager 120 can automatically detect the beginning of an interactive episode. When the episode starts, both the GUI controller and the task that is the receiver of the message are marked as being in an interactive episode. If tasks of an interactive episode communicate with unmarked tasks, then the as yet unmarked tasks are also marked. During this process, the intelligent energy manager 120 keeps track of how many of the marked tasks have been pre-empted. The end of the episode is reached when the number of pre-empted tasks is zero, indicating that all tasks have run to completion.

Figure 3:
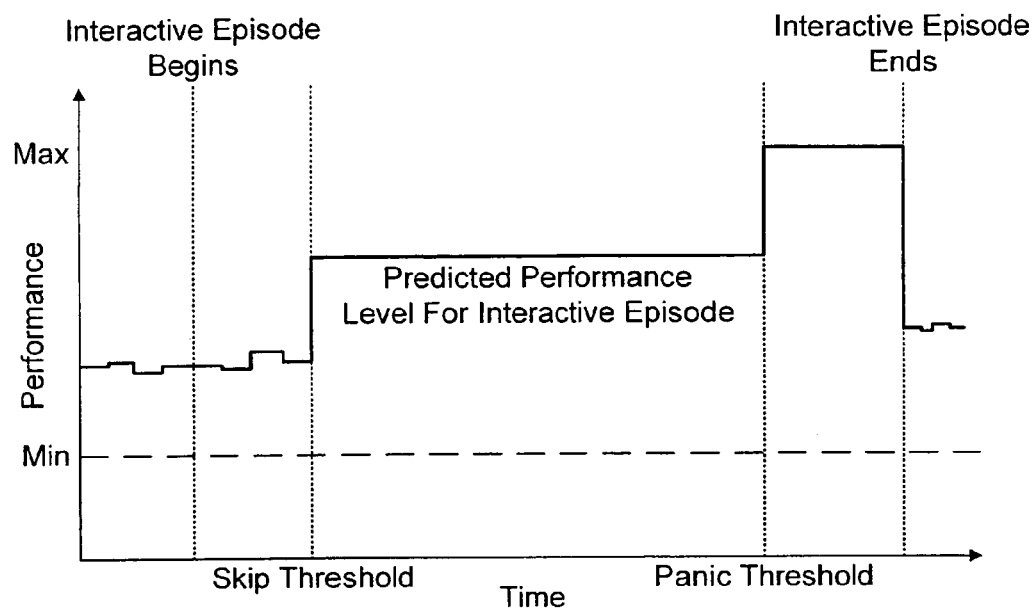
FIG. 3 illustrates the strategy for setting the processor performance level during an interactive episode.

FIG. 3 illustrates the strategy for setting the processor performance level during an interactive episode. The duration of an interactive episode is known to vary by several orders of magnitude (from around $10^{-4}$s up to around 1 second). However a transition-start latency or 'skip threshold' of 5 milliseconds is set to filter out the shortest interactive episodes thereby reducing the number of requested performance-level transitions. The sub-millisecond interactive episodes are typically the results of echoing key presses to the window or moving the mouse across the screen and redrawing small rectangles. The skip threshold is set at 5 milliseconds since this allows short episodes to be filtered out of the performance indicator predictions without adversely impacting the worst case.

If the interactive episode duration exceeds the skip threshold, then the associated performance-level value is included in the overall interactive performance-level prediction. The performance factor for the next interactive episode is given by a weighted exponentially decaying average of calculated performance factors for all past interactive episodes. Note that according to the present technique the interactive application performance setting algorithm uses a single global prediction for the necessary performance level for an interactive episode in the system. [This differs from the technique described in the above-mentioned publication, according to which a per-task performance-level prediction was used depending on which task initiated the episode.]

To bound the worst-case impact of an erroneous performance-level prediction on the user experience, if the interactive episode does not finish before reaching a so-called 'panic threshold', then the performance-level prediction of the top hierarchical layer is specified to be the maximum performance level. Since this is a top-level prediction it will be enforced by the system. At the end of the offending interactive episode, the interactive algorithm computes what the correct performance-setting for the episode should have been and this corrected value is incorporated into the exponentially decaying average so that it will influence future predictions. An additional optimisation is performed such that that if the panic threshold was in fact reached during an interactive episode, the moving average is re-scaled so that the corrected performance level is incorporated in the exponentially decaying average with a higher weight (k=1 is used instead of k=3). The performance prediction is computed for all episodes that are longer than the skip threshold.

Interactive episode 'deadlines' are used to obtain a performance-level indicator for each identified interactive episode. The deadline is the latest time by which a task must be completed to avoid adversely impacting performance. The performance level indicator for interactive episodes is calculated in dependence upon the human perception threshold associated with the particular interactive event. For example, it is known that a rate of 20 to 30 frames per second is fast enough for the user to perceive a series of images as a continuous stream so that the perception threshold could be set to 50 ms for an interactive image display episode. Although the exact value of the perception threshold is dependent on the user and the type of task being accomplished, a fixed value of 50 ms was found to be adequate for the interactive algorithm of the hierarchy. The equation below is used for computing the performance requirements of episodes that are shorter than the perception threshold.

$$Perf = \frac{Work_{fse}}{Perception\ Threshold}$$

where the full-speed equivalent work $Work_{fse}$ is measured from the beginning of the interactive episode.

The application-specific performance indicator 220 of the middle hierarchical layer is obtained by collating information output by a category of application programs that are aware of performance level setting functionality. These program applications have been adapted to submit (via system calls) specific information to the intelligent energy manager 120 about their specific performance requirements. The operating system and application programs can be provided with new API elements to facilitate this communication regarding performance requirements.

The perspectives-based performance indicator 230 is obtained by implementing a perspectives based algorithm that estimates future utilisation of the processor based on the recent utilisation history. This algorithm derives a utilisation estimate for each individual task and adjusts the size of a the time period over which the utilisation-history is calculated (i.e. the utilisation-history window) on a task by task basis. The perspectives-based algorithm takes account of all categories of task being performed by the processor whereas the interactive application algorithm of the uppermost layer takes account of interactive tasks. Since the interactive application algorithm calculates a performance-level indicator that aims to guarantee a high quality of interactive performance and it is situated at the uppermost level of the hierarchy, the perspectives-based algorithm need not be constrained to a conservatively short utilisation-history window. The possibility of using longer utilisation-history windows at this lowermost hierarchical level allows for improved efficiency since a more aggressive power reduction strategy can be selected when appropriate. If the utilisation-history window is too short, this can cause the performance-level predictions to oscillate rapidly between two fixed values. It is typically necessary to set a short utilisation history window where a single unified algorithm (rather than a hierarchical set of algorithms) is used to set the performance level for all run-time circumstances. To be able to cope with intermittent processor-intensive interactive events, such unified algorithms must keep the utilisation-history window short.

Each of the performance-setting algorithms of the 3-layer stack uses a measure of processing work-done in a given time interval. In this embodiment, the work-done measure that is used is the full-speed (of the processor) equivalent work $Work_{fse}$ performed in that time interval. This full-speed equivalent work estimate is calculated according to the following formula:

$$Work_{fse} = \sum_{i=1}^{n} t_i p_i$$

where i is one of n different processor performance levels implemented during the given time interval; $t_i$ is the non-idle time in seconds spent at performance level i; and $p_i$ is the processor performance level i expressed as a fraction of the peak (full-speed) processor performance level. This equation is valid on a system in which a time-stamp counter (work counter) measures real time. The work-done would be calculated differently in alternative embodiments that use cycle counters whose count rate varies according to the current processor frequency. Furthermore, the above equation makes the implicit assumption that the run-time of a workload is inversely proportional to the processor frequency. This assumption provides a reasonable estimate of work-done. However, primarily due to the non-linearity of bus speed to processor speed ratios during performance scaling, the assumption is not always accurate. In alternative embodiments the work-done calculation can be fine-tuned to take account of such factors.

Figure 4:
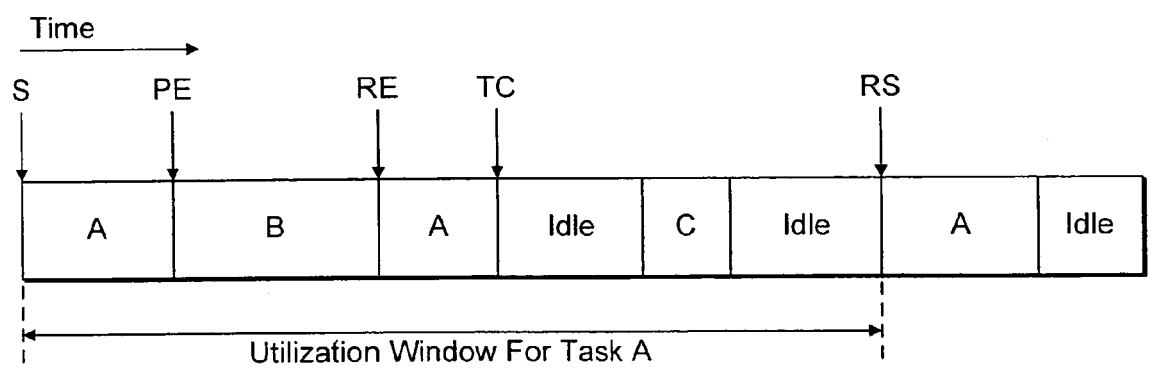
FIG. 4 schematically illustrates execution of a workload on the processor and calculation of the utilisation-history window for a task A.

FIG. 4 schematically illustrates execution of a workload on the processor and calculation of the utilisation-history window for a task A. The horizontal axis of FIG. 4 represents time. Task A first starts execution at time S, whereupon a number of per-task data structures are initialised. There are four of these data structures corresponding to the following four pieces of information: (i) the current state of the work counter; (ii) the current (real) time; (iii) the current state of an idle-time counter; and (iv) a run bit is set to logical level '1' indicating that the task has started running. The work-counter, the real-time counter and the idle-time counters are used to calculate the processor utilisation associated with task A and subsequently to calculate task A's performance requirements. At time PE, task A has not yet run to completion but is pre-empted by another task, task B. Pre-empting will occur when the task scheduler 114 determines that another task has higher priority than the task that is currently running. When task A is pre-empted the run bit is maintained at logical level of '1' to indicate that the task still has work to complete. At time RE, task A resumes execution, having been rescheduled, and continues to execute until it has run to completion at time TC whereupon it voluntarily gives up processing time. On completion task A may initiate a system call that yields the processor to another task. On completion of task A at time TC the run-bit is reset to logical level '0'.

After time TC, there is an idle period followed by execution of a further task C and a subsequent idle period. At time RS, task A begins execution for a second time. At time RS, the '0' state of the run-bit associated with task A indicates that information exists to enable calculation of task A's performance requirements so that the processor target performance level can be accordingly set for the imminent re-execution of task A. The utilisation-history window for a given task is defined to be the period of time from the start of the first execution of the given task to the start of the subsequent execution of the given task and should include at least one pre-empting event (task A is pre-empted by task B at point RE in this case) of the given task within the relevant window. Accordingly, in this case the utilisation-history window for task A is defined to be the time period from time S to time RS. The target performance level for task A in this window is calculated as follows:

$$WorkEst_{New}=(k \times WorkEst_{Old}+Work_{fse})/(k+1)$$

$$Deadline_{New}=(k \times Deadline_{Old}+(Work_{fse}+Idle))/(k+1)$$

where k is a weighting factor, Idle is the idle time in seconds in the time interval from time S to time RS in FIG. 4 and the deadline for task A is defined to be ($Work_{fse}$+Idle). In this particular example, performing detection of pre-empting tasks such as task B in FIG. 4 guides the algorithm in determining the utilisation-history window for each task. Processing tasks that are run before the next non-preempted scheduling of task A are often highly correlated with the execution of task A. The idle time between time points TC and RS is the "slack" that can be taken up by running the processor at a reduced performance level. However, task C is factored into the performance level calculation since it diminishes the available slack.

The above equations for $WorkEst_{New}$ and $Deadline_{New}$ each represent an exponentially decaying average. Such exponentially decaying averages allow for more recent estimates to have more influence on the average than less recent estimates. The weighting factor k is a parameter associated with the exponentially decaying average. It was found that a value of k=3 worked effectively and this small value indicates that each estimate is a good estimate. By keeping track of the work predictor and the deadline predictor separately, the performance predictions are weighted according to the length of the utilisation-history window. This ensures that the performance estimates associated with the larger window sizes do not dominate the performance prediction. The performance level indicator $Perf_{perspectives-based}$ for this algorithm is given by the ratio of the two exponentially decaying averages: $Perf_{perspectives-based}=WorkEst_{New}/Deadline_{New}$. A separate performance level value is calculated for each task. According to the strategy of the present technique, the work estimates WorkEst for a given task is re-calculated on a workload dependent time-interval of between 50 and 150 milliseconds. However, since WorkEst is calculated on a task by task basis so that each executed task draws on a respective appropriate task-based WorkEst value, the WorkEst is actually refined every 5 to 10 milliseconds (reflecting task switching events). This algorithm differs from known interval-based algorithms in that it derives an utilisation estimate separately for each task and also adjusts the size of the utilisation-history window on a task by task basis. Although known unified performance-setting algorithms use exponentially decaying averages, they calculate a global average over all performance tasks for a fixed utilisation-history window (10 to 50 milliseconds) rather than a task-based average over a variable task-based utilisation-history window.

According to the perspectives-based algorithm of the present technique it is necessary to avoid a situation occurring whereby a new non-interactive CPU bound task utilises the processor for an extensive period without being pre-empted. This could introduce substantial latency in adaptation of the performance level to the task since the utilisation-history window can only be defined once the task has been pre-empted at least once. To avoid unwanted performance adaptation latency an upper threshold is set for the non pre-empted duration over which the work estimate is calculated. In particular, if a task continues without being pre-empted for 100 milliseconds, then its work estimate is recalculated by default. The value of 100 milliseconds was selected by taking into account that a more stringent application-history window is ensured for interactive applications via the dominant hierarchical layer 210, which produces a separate interactive application performance indicator. It was also considered that the only class of user applications likely to be affected by the 100 millisecond window threshold are computationally intensive batch jobs such as compilation, which are likely to run for several seconds or even minutes. In such cases an extra 100 milliseconds (0.1 seconds) of run time is unlikely to be significant performance-wise.

Figure 5:
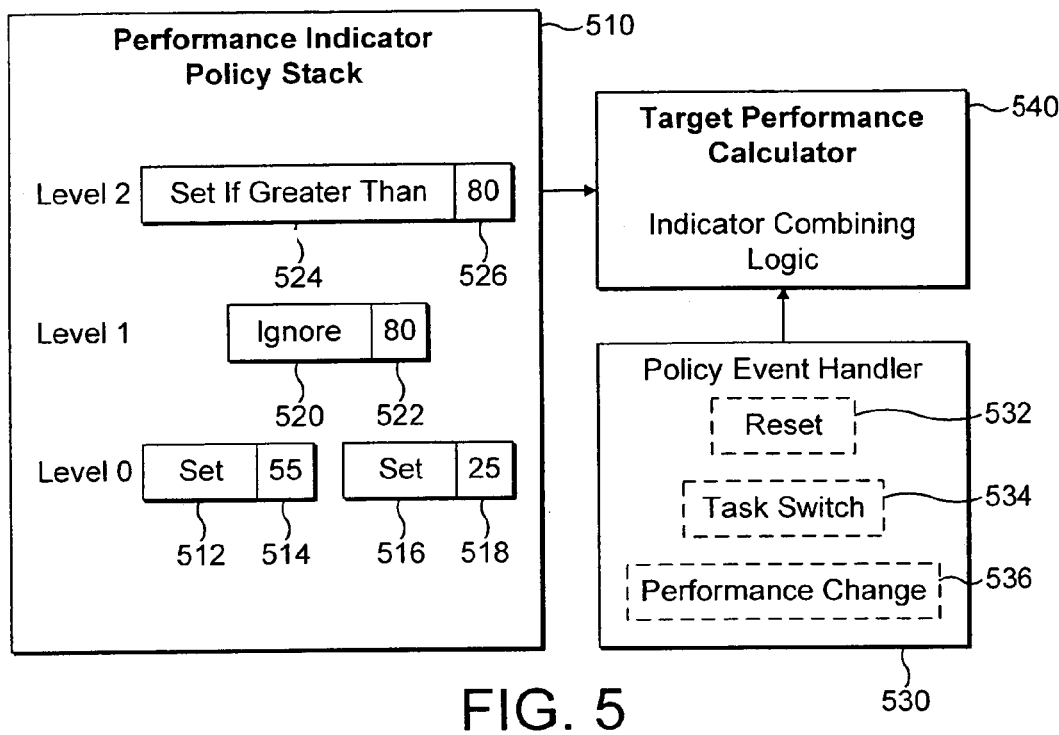
FIG. 5 schematically illustrates an implementation of the three-layer hierarchical performance policy stack of FIG. 2.

FIG. 5 schematically illustrates an implementation of the three-layer hierarchical performance policy stack of FIG. 2. The implementation comprises a performance indicator policy stack 510 and a policy event handler 530, each of which outputs information to a target performance calculator 540. The target performance calculator 540 serves to collate the results from four performance-setting algorithms: top level interactive algorithm, middle level application-based algorithm and two different lower level algorithms. The four algorithms are capable of being run concurrently. The target performance calculator 540 derives a single global target performance level from the multiple performance indicators (in this case four) produced by the policy stack 510. The policy stack 510 together with the policy event handler 530 and the target performance calculator 540 provides a flexible framework for multiple performance-setting policies so that policy algorithms of each level of the stack can be replaced or interchanged as desired by the user. Accordingly the performance policy-stack provides a platform for experimentation in which user-customised performance-setting policies can be incorporated.

Each of the multiple performance-setting algorithms is specialised to cope with a different specific category of run-time events. However, since there are four different algorithms in the example embodiment of FIG. 5, all out-putting different performance-indicators, the software must make decisions as to, which of the four performance-indicators should take precedence in setting the global target value. Furthermore, decisions must be made as to the times at which a global target performance-level can be validly calculated, given that each performance-setting algorithm can run independently and produce output at different times. It must also be considered how to combine the performance-indicators in the event that the multiple performance-setting algorithms all base their decisions on the same processing event, otherwise spurious target updates may occur.

To address these issues the policy stack 510 algorithms are organised in a three-level hierarchy as shown, where policies at higher levels are entitled to override performance level requests derived from lower (less dominant) levels. Accordingly, the level 2 algorithm can override the level 1 algorithm, which can in turn override the two algorithms of level 0. Note that each hierarchical level may itself comprise multiple alternative performance-setting algorithms. The different performance-setting algorithms are not aware of their positions in the hierarchy and can base their performance decisions on any event in the system. When a given algorithm requests a performance level it submits a command along with its desired performance level to the policy stack 510. For each algorithm of the policy stack a data structure comprising a command 512, 516, 520, 524 and a corresponding performance level indicator 514, 518, 522 and 526 is stored. The command IGNORE 520 which applies to the level 1 algorithm indicates to the target performance calculator 440 that the associated performance-level indicator should be disregarded in calculation of the global performance target. The command SET 512, 516 that has been specified for both of the level 0 algorithms causes the target performance calculator 540 to set the corresponding performance level without regard to any performance-level request coming from lower in the hierarchy. However the SET command cannot override performance level requests from higher hierarchical levels. In this embodiment one level 0 algorithm has requested that the performance be set to 55% of peak level whereas another level 0 algorithm has requested that the performance be set to 25% of peak level. The target performance calculator uses an operator to combine these two equal-priority requests, in this case preferentially selecting the 55% value as the level 0 performance-indicator. At level 2, the command 'SET IF GREATER THAN' has been specified together with a performance indicator of 80%. The 'SET IF GREATER THAN' command provides that the target performance calculator 540 should set the global target performance-level to be 80% provided that this is greater than any of the performance indicators from lower hierarchical levels. In this case the level 0 performance indicator is 55% and the level 1 performance indicator is to be disregarded so that the global target will indeed be set to 80% of peak performance.

Since the most recently calculated performance level indicators for each algorithm are stored in memory by the policy stack 510, the target performance calculator 540 can calculate a new global target value at any time without having to invoke each and every performance-setting algorithm. When a new performance level request is calculated by one of the algorithms on the stack, the target performance calculator will evaluate the contents of the command-performance data structures from the bottom level up to compute an updated global target performance level. Accordingly in the example of FIG. 5, at level 0 the global prediction is set to 55%, at level 1 it remains at 55% and at level 2 the global prediction changes to 80%. Although each of the performance-setting algorithms can be triggered (by a processing event in the system) to calculate a new performance level at any time there is a set of common events to which all of the performance-setting algorithms will tend to respond. These events are monitored and flagged by the policy event handler 530, which provides policy event information to the target performance calculator 540. This special category of events comprises reset events 532, task switch events 534 and performance change events 536. The performance change event 536, is a notification that alerts each performance setting algorithm to the current performance level of the processor although it does not usually alter the performance requests on the policy stack 510. For this special category of policy events 532, 534, 536, the global target level is not recomputed each time one of the algorithms issues an updated performance-level indicator. Rather, the target performance level calculation is co-ordinated so that the calculation is performed once only for each event notification after all event handlers of all interested performance setting algorithms have been invoked.

Device drivers or devices themselves may be provided with an application program interface (API) that enables an individual device to inform the policy stack 510 and/or individual performance setting algorithms of the policy stack of any significant change in operating conditions. This allows the performance-setting algorithms to trigger recalculation of target performance levels thereby promoting rapid adaptation to the change in operating conditions. For example, a notification could be sent by the device to the policy stack 510 when a processor-intensive CPU-bound task starts up. Such a notification is optional and the performance-setting algorithms may but need not respond to it on reception.

Figure 6:
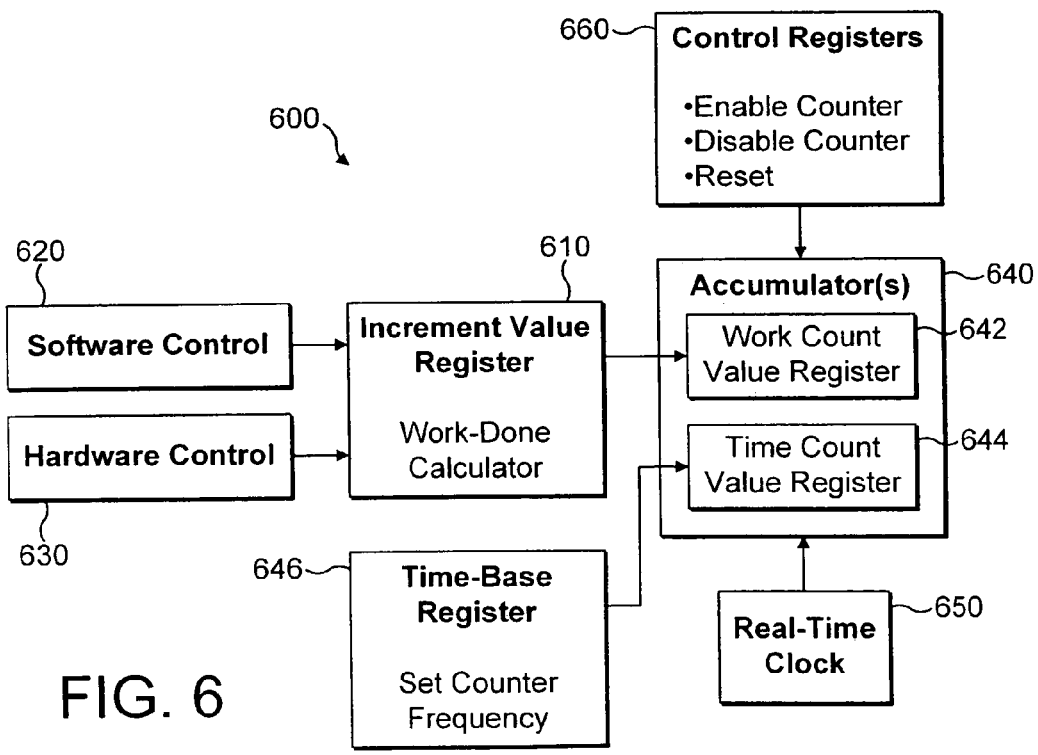
FIG. 6 schematically illustrates a work-tracking counter 600 according to the present technique.

FIG. 6 schematically illustrates a work-tracking counter 600 according to the present technique. The work-tracking counter 600 comprises: an increment value register 610 having a software control module 620 and a hardware control module 630; an accumulator module 640 comprising a work-count value register and a time-count value register; a time-base register 646; a real-time clock 650 and a control register 660. The work-tracking counter of this example embodiment differs from known timestamp counters and CPU cycle counters in that the counter increment values are proportional to the actual work being performed by the processor at or close to the time that the count value is incremented. The increment value register 610 comprises a work-done calculator that estimates the work done by the processor in each counter cycle. The work done estimates are obtained via the software control module 620 and/or via the hardware control module 630. The software control module 620 implements a simple work-done calculation that correlates the increment value with the current processor speed. If the processor is running at 70% of peak performance then the increment value will be 0.7 whereas if the processor is running at 40% of peak-performance the increment value will be 0.4. When the software control module 620 detects that the processor is idle during a counter cycle then the increment value is set to zero. In alternative embodiments of the work-tracking counter a more sophisticated software algorithm is used to calculate a refined work-done estimate.

Table 1 lists measurement data that gives a percentage discrepancy between an expected run-time duration and an actual run-time duration for both a CPU bound loop and for an MPEG video workload when considering a performance-level transition between two different processor speeds (from a higher to a lower speed in this case). The results are based on post-transition runs at three distinct processor performance levels: 300, 400, and 500 Mhz (as specified in the left-most column of table). The top row of Table 1 lists the initial performance level from which the transition to the corresponding processor speed in the left-most column was made. On the CPU bound loop, the difference between the predicted and actual measurements are indistinguishable from the noise, whereas for the MPEG workload, there is about a 6%-7% inaccuracy penalty per 100 Mhz step in processor frequency. The maximum inaccuracy on these workloads is seen to be less than 20% (19.4%),which is considered to be acceptable for a system with only a few fixable performance-levels. However as the available range of minimum to maximum processor performance levels that are selectable in a system increases and the range of each performance-level step decreases, it is likely that a more accurate work-estimator than the processor speed will be required.

| Post-transition speed | CPU BOUND LOOP | | | MPEG VIDEO WORKLOAD | | |
|---|---|---|---|---|---|---|
| | 400 MHz | 500 MHz | 600 MHz | 400 MHz | 500 MHz | 600 MHz |
| 300 MHz | −0.3% | −0.4% | −0.3% | 7.1% | 13.5% | 19.4% |
| 400 MHz | | −0.1% | 0.0% | | 6.9% | 13.3% |
| 500 MHz | | | 0.1% | | | 6.8% |

The more sophisticated algorithm of alternative example embodiments uses a more accurate work-done estimation technique that involves monitoring the instruction profile (via counters that keep track of significant events such as memory accesses) and the expected and actual decrease rate of the workload, rather than making the assumption that the work-done is directly proportional to the processor speed. Further alternative embodiments use cache hit-rates and memory-system performance indicators to refine the work-done estimate. Yet further alternative example embodiments use software to monitor the percentage of processing time used in executing a programming application (equated to useful work-done) relative to the percentage of processing time used in performing background operating-system tasks.

The hardware control module 630 is capable of estimating work-done even during transition periods when the processor is in the process of switching between two fixed performance levels. For each processor performance transition there will be a pause of around 20 microseconds during which the processor does not issue any instructions. This pause is due to the time needed to resynchronise the phase-locked-loops to the new target processor frequency. Furthermore, before the processor frequency can be changed, the voltage must be stabilised to an appropriate value for the new target frequency. Accordingly, there is a transition time of up to 1 millisecond, during which it can be assumed that the processor is running at the old target frequency but energy is being consumed at the new target level (since the voltage has been set to the new target level). The frequency may be ramped up in several stages via intermediate frequency steps to affect the performance-level change. During such transition periods when the frequency of the processor is changing dynamically the hardware control module 630 is operable to update the increment value register taking account of the dynamic changes of which the software is unaware. Although this example embodiment makes use of both hardware and software control modules 620, 630 to calculate the work done, alternative example embodiments may use only one of these two modules to estimate the work-done.

The accumulator(s) module 640 periodically reads the increment value from the increment value register 610 and adds the increment value to an accumulated sum stored in the work-count value register. The work-count value register increments the work-count value every clock-tick. The clock-tick is a time signal derived from the real-time clock 650. To measure the work-done during a predetermined time-interval the work-count value stored in the accumulator(s) module 640 is read twice: once at the beginning of the predetermined time interval and once at the end. The difference between these two values provides an indication of the work-done during the predetermined time interval.

The real-time clock 650 also controls the rate at which the time-count value stored in the register 644 is incremented. This time-count value register works on the same time base as the work-count value but is used to measure time elapsed rather than work done. Having both a time counter and a work-done counter facilitates performance-setting algorithms. The time-base register 646 is provided for the purpose of multi-platform compatibility and conversion to seconds. It serves to specify the time base (frequency) of the two counters 642, 644 so that time can be accurately and consistently be i.e. the accumulated value stored in the time count value register provides an indication of the time elapsed in milliseconds. The control register module 660 comprises a two control registers, one for each counter. A counter can be enabled, disabled or reset via the appropriate control register.

FIG. 7 schematically illustrates an apparatus that is capable of providing a number of different fixed performance-levels in dependence upon workload characteristics. The apparatus comprises a CPU 710, a real-time clock 720, a power supply control module 730 and the increment value register 610 of the work-tracking counter of FIG. 6. The power supply control module 730 determines which of the fixed performance-levels the CPU is currently set to run at and selects an appropriate clock frequency for the real-time clock 720. The power-supply control module 730 inputs information on the current processor frequency to the increment value register 610. Accordingly the value of the increment is proportional to the processor frequency, which in turn provides an estimate of useful work-done by the processor.

Many of the performance-setting algorithms of the policy stack 510 use the utilisation history of the processor over a given time interval (window) to estimate the appropriate future target speed of the processor. The principal objective of any performance-setting policy is to maximise the busy time of the processor in the period from the start of execution through to the task deadline by reducing the processor frequency and voltage levels an appropriate target performance level.

To enable the target performance level to be realistically predicted, the intelligent energy manager 120 provides an abstraction for tracking the actual work done by the processor during a given time interval. This work-done abstraction allows performance changes and idle time to be taken into account regardless of the specific hardware counter implementations, which can vary between platforms. According to the present technique, to obtain a work measurement estimate over a time interval, each performance-setting algorithm is allocated a 'work structure' data structure. Each algorithm is set up to call a 'work-start function' at the beginning of the time interval and a 'work-stop function' at the end of the given time interval. During the work-done measurement, the contents of the work structure are automatically updated to specify the proportion of idle time and the proportion of utilised processor time weighted by the respective performance levels of the processor. The information stored in the work structure is then used to compute the full-speed equivalent work value (Work$_{fse}$), which is subsequently be used for target performance-level prediction. This work-done abstraction functionality, which is implemented in software in the intelligent energy manager 120 provides performance-level prediction algorithm developers with a convenient interface to the intelligent energy manager 120. The work-done abstraction also simplifies porting of the performance-setting system of the present technique to different hardware architectures.

One significant difference between alternative hardware platforms is the manner in which time is measured on the platform. In particular, some architectures provide a low overhead method of cycle-counting via timestamp counters whereas other architectures only provide the user with externally programmable timer interrupts. However even when timestamp counters are provided they do not necessarily measure the same things. For example a first category of hardware platforms includes both current Intel [RTM] Pentium and ARM [RTM] processors. In these processors the timestamp counters count CPU-cycles so that the count-rate varies in accordance with the speed of the processor and the counter stops counting when the processor enters into sleep mode. A second category of hardware platforms, which includes the Crusoe [RTM] processor, have an implementation of the timestamp counter that consistently counts the cycles at the peak rate of the processor and continues to increment the count at the peak rate even when the processor is in sleep mode. The work-done abstraction facilitates implementation of the present target performance-setting technique on both of these two alternative categories of hardware platform.

The work estimate Work$_{fse}$ as calculated in this embodiment does not take account of the fact that a given workload running at half of peak performance does not necessarily take twice as long to run to completion as it would at the full processor speed. One reason for this counter-intuitive result is that although the processor core is slowed down, the memory system is not. As a result, the core to memory performance ratio improves in the memory's favour.

Simulations were performed to evaluate the present performance-setting technique against a known technique. In particular, the known technique is a 'LongRun' power manager that is built-into a Transmeta Crusoe processor. The Transmeta's Crusoe processor has the LongRun power manager built into the processor firmware. LongRun is different from other known power management techniques in that it avoids the need to modify the operating system in order to effect the power management. LongRun uses the historical utilisation of the processor to guide clock rate selection: it speeds up the processor if utilisation is high and decreases performance if utilisation is low. Unlike on more conventional processors, the power management policy can be implemented on the Crusoe processor relatively easily because the processor already has a hidden software layer that performs dynamic binary translation and optimisations. The simulations aimed to establish how effectively a policy such as LongRun that is implemented at such a low level in the software hierarchy can perform. The present technique was run alongside LongRun on the same processor.

The simulations were performed on a Sony Vaio [RTM] PCG-C1VN notebook computer using the Transmeta Crusoe 5600 processor running at a number of fixed performance levels ranging from 300 Mhz to 600 Mhz in 100 Mhz performance-level steps. The simulations used a Mandrake 7.2 operating system with a modified version of the Linux 2.4.4-ac18 kernel. The workloads used in the comparative evaluation were as follows: Plaympeg SDL MPEG player library; Acrobat Reader for rendering PDF files; Emacs for text editing; Netscape Mail and News 4.7 for news reading; Konqueror 1.9.8 for web browsing; and Xwelltris 1.0.0 as a 3D game. The benchmark used for interactive shell commands was a record of a user performing miscellaneous shell operations during a span of about 30 minutes. To avoid possible variability due to the dynamic translation engine of the Crusoe processor, most benchmarks were run at least twice to warm up the dynamic translation cache, simulation data from all but the last run was disregarded.

The performance-setting algorithm according to the present technique has been designed so that it is unobtrusive to its host platform is the way timers are handled. For the purpose of the simulations the present technique provided a sub-millisecond resolution timer, without changing the way in which the Linux built-in 10 ms resolution timer worked. This was accomplished by piggybacking a timer dispatch routine (which checks for timer events) onto often executed parts of the kernel, such as the scheduler and system calls.

Since the performance-setting algorithm according to the present technique is designed such that it has hooks to the kernel that allow it to intercept certain system calls to find interactive episodes and it is invoked on every task switch, it was straight-forward to add a few instructions to these hooks to manage timer dispatches. Each hook was augmented by implementing a read of the timestamp counter, a comparison against the time stamp of the next timer event and a branch to the timer dispatch routine upon success. In practice it was found that this strategy yielded a timer with sub-millisecond accuracy.

Table 2 below details the timer statistics pertaining to the simulations. The worst-case timer resolution was bounded by the 10 millisecond (seems to be inconsistent with Table 2) time quantum of the scheduler. However, since the events that the performance-setting algorithm according to the present technique is interested in measuring usually occur close to the timer triggers, the achieved resolution was considered to be adequate. It proved to be advantageous that the soft-timers of the system stopped ticking when the processor was in sleep mode since this meant that the timer interrupts did not change the sleep characteristics of the running operating system and program applications. The timers used had high resolution but low overhead.

These advantageous features of the timers facilitated development of an implementation having both an active mode and a passive mode. In the active mode the performance-setting algorithm according to the present technique was in control. In the passive mode the built-in LongRun power manager was in charge of performance although the intelligent energy manager of the present technique acted as an observer of the execution and performance changes.

TABLE 2

| | |
|---|---|
| Cost of an access to a timestamp counter | 30 to 40 cycles |
| Mean interval between timer checks | ~0.1 milliseconds |
| Timer accuracy | ~1 millisecond |
| Average timer check and dispatch duration (including possible execution of an event handler) | 100 to 150 cycles |

Monitoring the performance changes caused by LongRun was accomplished similarly to the timer dispatch routine. The intelligent energy manager 120 according to the present technique periodically read the performance level of the processor through a machine-specific register and compared the result to a previous value. If the two values were different, then the change was logged in a buffer. The intelligent energy manager according to the present technique includes a tracing mechanism that retains a log of significant events in a kernel buffer. This log includes performance-level requests from the different policies, task pre-emptions, task IDs (identifiers), and the performance levels of the processor. In performing the simulations it was possible to compare LongRun and the performance-setting algorithm according to the present technique during the same execution run: LongRun was is in control performance-setting while the intelligent energy manager 120 of the present technique was operable to output the decisions that it would have made on the same workload, had it been in control. This simulation strategy was used to objectively assess the differences between unrepeatable runs of interactive benchmarks between the known LongRun technique and the present technique.

In order to assess the overhead of using the measurement and performance-setting techniques, the performance-setting algorithm according to the present technique was instrumented with markers that kept track of the time spent in the performance-setting algorithm code at run-time. Although the run-time overhead of the present technique on a Pentium II was found to be around 0.1% to 0.5%, on the Transmeta Crusoe processor the overhead was between 1% and 4%. Further measurements in virtual machines such as 'VMWare' and 'user-mode-linux' (UML) confirmed that the overhead of the performance-setting algorithms according to the present technique can be significantly higher in virtual machines than on traditional processor architectures. However this overhead could be effectively reduced by algorithm optimisation.

MPEG (Motion Pictures Expert Group) video playback posed a difficult challenge for all of the tested performance-setting algorithms. Although the performance-setting algorithms typically put a periodic load on the system, the performance requirements can vary depending on the MPEG frame-type. As a consequence, if a performance-setting algorithm uses a comparatively long time-window corresponding to past (highly variable) MPEG frame-decoding events to predict future performance requirements, it can miss the execution deadlines for (less-representative) more computationally intensive frames. On the other hand, if the algorithm looks at only a short interval, then it will not converge to a single performance value but oscillate rapidly between multiple settings. Since each change in performance-level incurs a transition delay, rapid oscillation between different performance-levels is undesirable. The simulation results for LongRun confirm this oscillatory behaviour for the MPEG benchmark.

The present technique deals with this problem of oscillation for the MPEG workload by relying on the interactive performance-setting algorithm at the top level of the hierarchy to bound worst-case responsiveness. The more conventional interval-based perspectives algorithm at the bottom level of the hierarchy is thus able to take a longer-term view of performance-level requirements.

FIG. 8 is a table that details simulation measurement results for the 'plaympeg' video player (http://www.lokigames.com/development/smpeg.php3) playing a variety of MPEG videos. Some of the internal variables of the video player have been exposed to provide information about how the player is affected as the result of dynamically changing the processor performance-level during execution. These figures are shown in the MPEG decode column of the table. In particular, the 'Ahead' variable measures how close to the deadline each frame decoding comes. The closeness to the deadline is expressed as cumulative seconds during the playback of each video. For maximum power efficiency, the Ahead variable value should be as close to zero as possible, although the slowest performance level of the processor puts a lower limit how much the Ahead value can be reduced. An 'Exactly on time field' in the right-most column of the table specifies the total number of frames that met their deadlines exactly. The more frames that are exactly on time, the closer the performance-setting algorithm is to the theoretical optimum. The data in the Execution Statistics column of the table of FIG. 8 was collected by the intelligent energy manager 120 monitoring sub-system. To collect information about LongRun, the intelligent energy manager 120 was used in passive mode to gather a trace of performance changes without controlling the processor performance level. The Idle field specifies the fraction of time spent in the idle loop of the kernel (possibly doing housekeeping chores or just spinning) whereas the Sleep field specifies the fraction of time that the processor actually spends in a low-power sleep mode. It can be seen from the table in FIG. 8 that for each of these performance measures the present technique performs considerably better than LongRun.

FIG. 9 is a table that lists processor performance level statistics collected during the runs of each workload. The fraction of time at each performance level is computed as a proportion of the total non-idle time during the run of the workload. The 'Mean perf' level column of the table specifies the average performance levels (as the percentage of peak performance) during the execution of each workload. Since, in all cases, the mean performance level for each workload was lower using the present technique than for LongRun, the last column specifies the mean performance reduction achieved with regard to LongRun. The playback quality for both the LongRun workload and the workload of the present technique was the same i.e. identical frame rates and no dropped frames.

The results show that the present technique is more accurately able to predict the necessary performance level than the known LongRun technique. The increased accuracy results in an 11% to 35% reduction of the average performance levels of the processor during execution of the benchmarks. Since the amount of work between runs of a workload should stay the same, the lower average performance level implied that reduced idle and sleep times could be expected when the intelligent energy manager of the present technique is enabled. This expectation was affirmed by the simulation results. Similarly, the number of frames that exactly meet their deadlines increases when the intelligent energy manager of the present technique is enabled and the cumulative amount of time when decode is ahead of its deadline is reduced.

The median performance level (highlighted with bold in each column of the table of FIG. 9) also shows significant reductions. Whereas on most benchmarks the performance-setting algorithm according to the present technique settles on a single performance level below peak for the greatest fraction of execution time (>88%), LongRun usually sets the processor to run at full-speed. The exception to this general rule is the 'Danse De Cable' workload, where the performance-setting algorithm according to the present technique settles on the lowest two performance levels and oscillates between these two levels. The reason for this oscillatory behaviour is due to the specific performance levels on the Crusoe processor. The performance-setting algorithm according to the present technique would have elected to select a performance level of only slightly higher than 300 Mhz so that as the performance-level prediction fluctuated above and below the 300 MHz value, the target performance-level was quantized to the closest two performance levels. The most notable difference in performance between the known LongRun technique and the present technique is that LongRun appears to be over-cautious in that it ramps up the performance level very quickly when it detects significant amounts of processor activity.

Over all workloads, the average processor performance level with LongRun never fell below 80%, whilst the performance level set by the present technique fell to as low as 52% for the 'Red's Nightmare small' benchmark. The algorithm according to the present technique is more aggressive than LongRun but responds quickly when the quality of service appears to have been compromised. Since LongRun does not have any information about the interactive performance, it is forced to act conservatively on a shorter time frame and the simulation results show that this leads to inefficiencies.

Figure 10A:
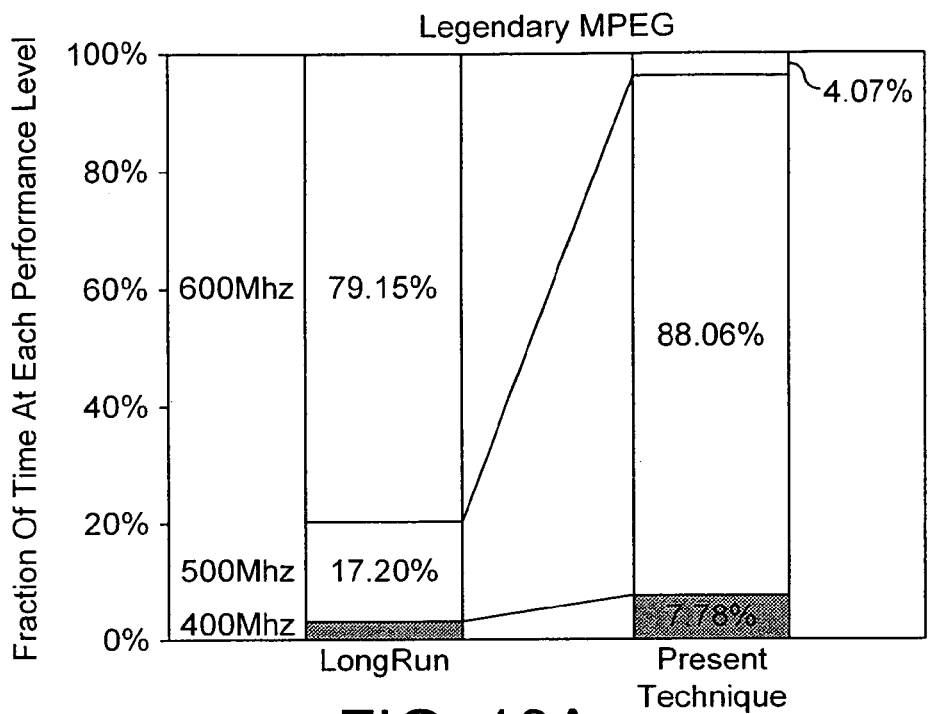
FIG. 10 comprises two graphs of results for playback of two different MPEG movies entitled 'Legendary' (FIG. 10A) and 'Danse de Cable' (FIG. 10B)
Figure 10B:
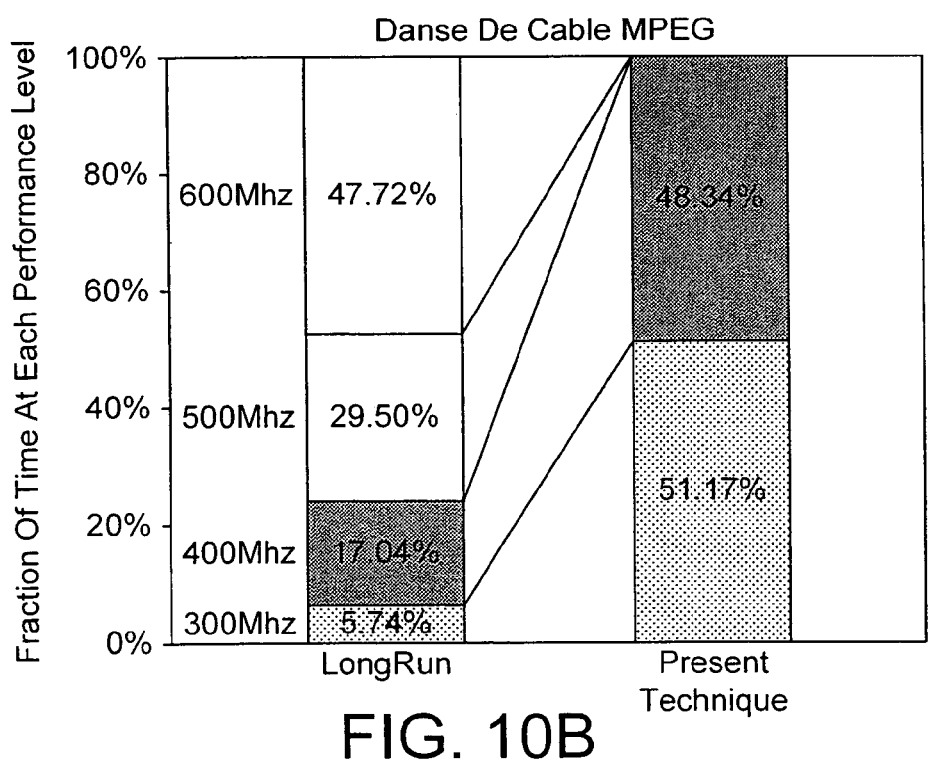

FIG. 10 comprises two graphs of results for playback of two different MPEG movies entitled 'Legendary' (FIG. 10A) and 'Danse de Cable' (FIG. 10B). Each graph illustrates the fraction of time spent at each of four processor performance levels (300, 400, 500, and 600 MHz) for both LongRun and the present technique. Although the playback quality of for each run was identical, it can be seen from the graphs that use of the algorithm according to the present technique meant that the processor spent significantly longer at below peak performance than it did when the LongRun technique specified the performance level. The results for playback of the 'Legendary' movie plotted in FIG. 10A show that the algorithm according to the present technique settles on a performance level of 500 MHz. The results for the 'Danse de Cable' movie shown in FIG. 10B reveal that using the algorithm according to the present technique, the processor switched between two performance-levels i.e. 300 MHz and 400 MHz. By way of contrast, for both of these movies the LongRun performance setting algorithm chose the peak processor speed of 600 MHz for a dominant portion of the execution time.

Figure 11A:
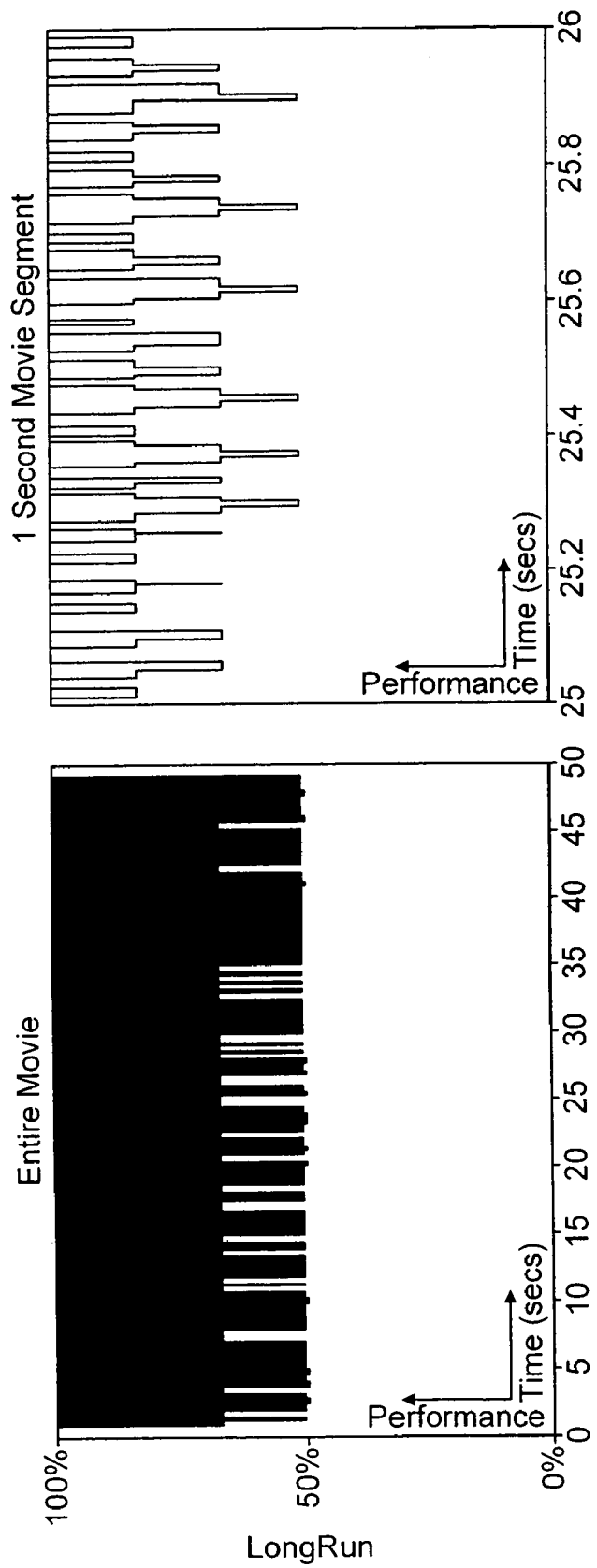
FIGS. 11A, B and C schematically illustrate the characteristics of two different performance-setting policies.
Figure 11B:
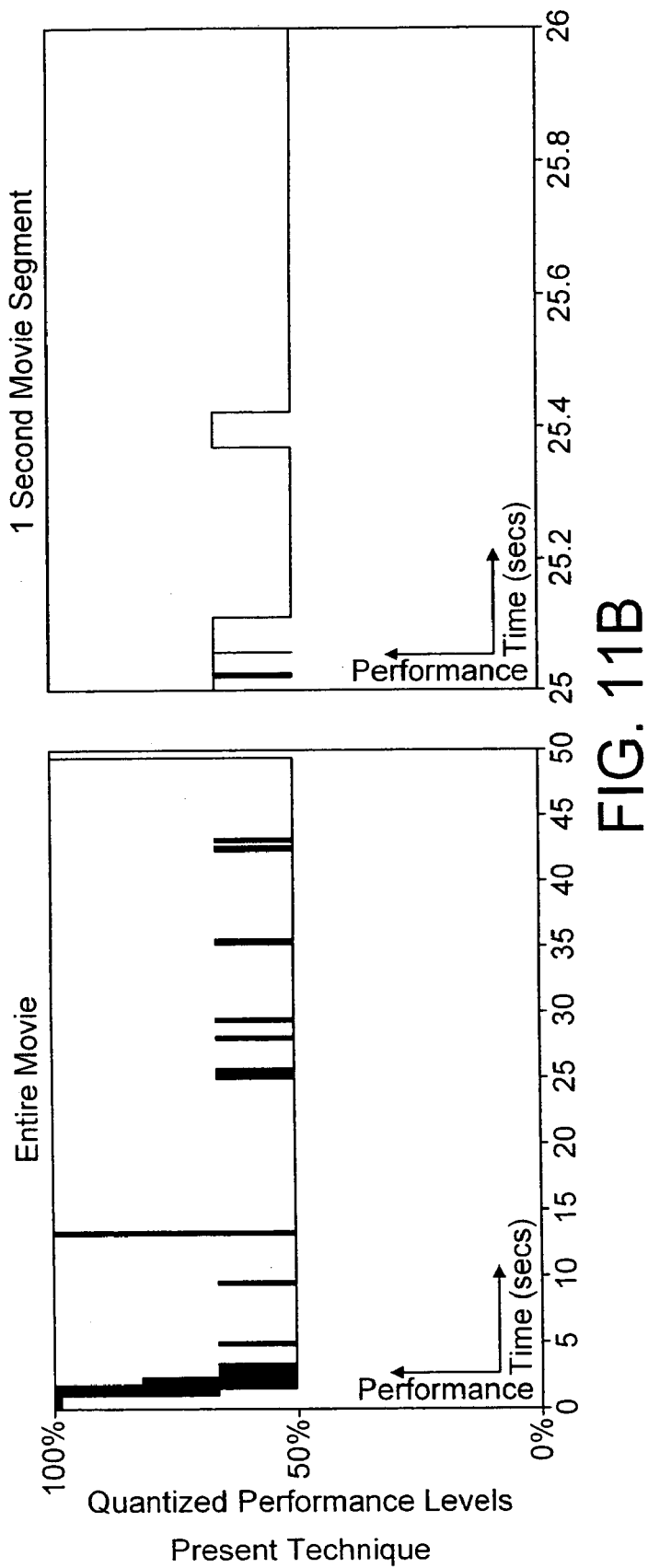
Figure 11C:
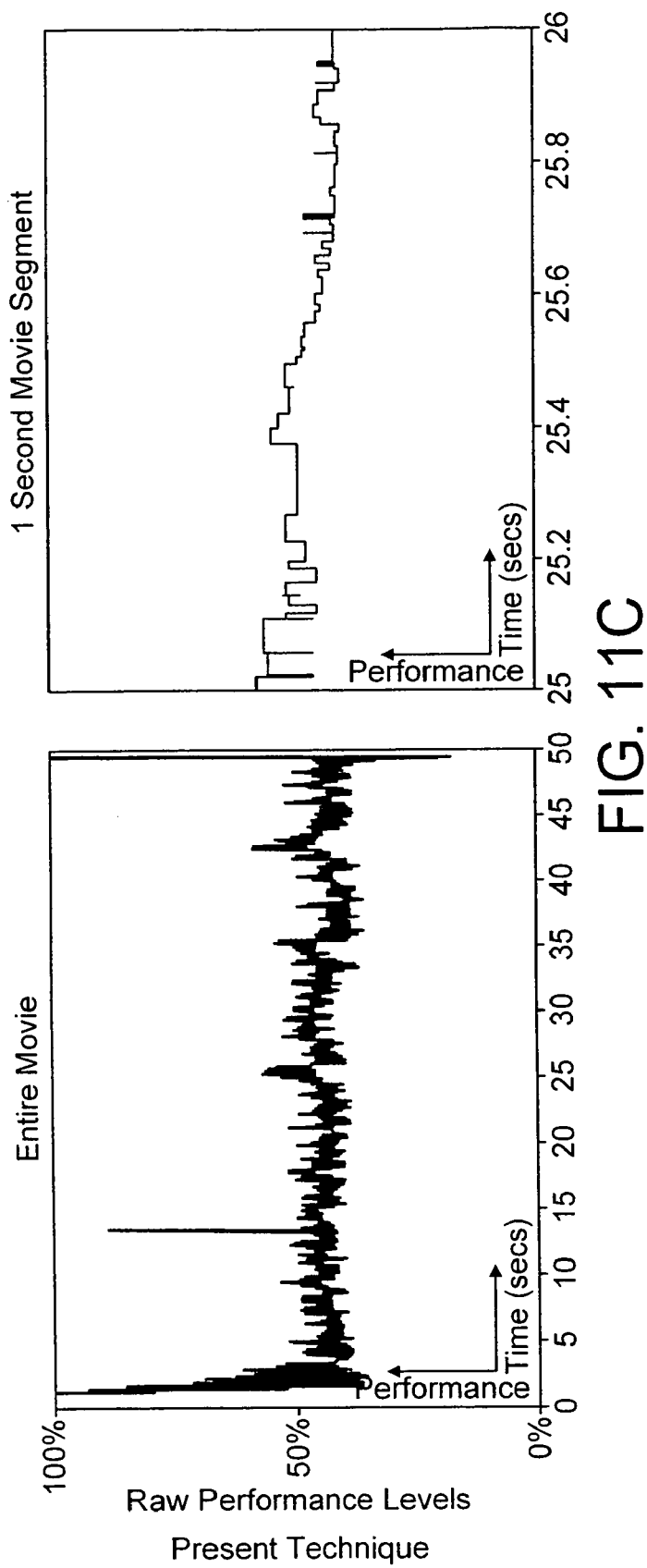

FIG. 11 provides qualitative insight into the characteristics of the two different performance-setting policies. LongRun keeps switching the performance level up and down in fast succession, while the processor performance-level of the system when controlled according to the present technique stays close to a target performance level. The two graphs of FIG. 11A (top row) show the performance levels of the processor during a benchmark run with LongRun enabled. FIGS. 11B and 11C (middle and bottom rows) show performance-level results for the same benchmark but with the algorithm of the present technique enabled. FIG. 11B shows the actual performance levels during execution, while FIG. 11C reflects the performance level that the performance-setting algorithm according to the present technique would request on a processor that could run at arbitrary performance levels (given the same max. performance). Note that in some cases, the desired performance levels calculated by algorithm according to the present technique the are actually below the minimum achievable performance-level on the processor.

Now consider simulation results for comparison of the two techniques on interactive workloads. Due to the difficulty in making interactive benchmark runs repeatable, interactive workloads are significantly harder to evaluate than the multimedia benchmarks. To circumvent this problem, empirical measurements were combined with a simple simulation technique. More specifically, the interactive benchmarks were run under the control of the native LongRun power manager and the intelligent energy manager 120 according to the present technique was only engaged in passive mode, so that it merely recorded the performance-setting decisions that it would have made but did not actually change the performance levels of the processor.

Figure 12A:
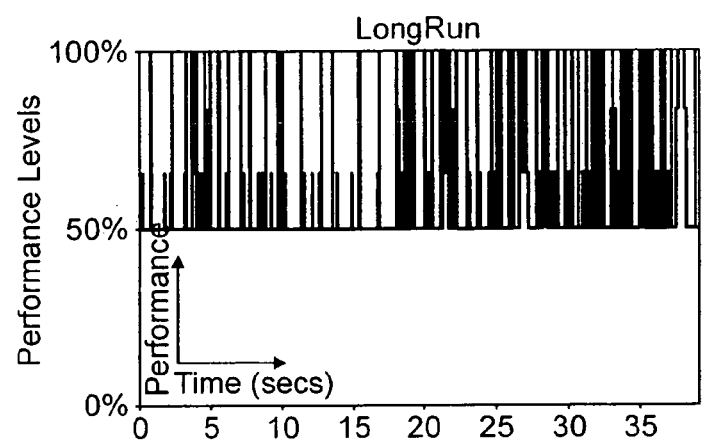
FIGS. 12A, B and C schematically illustrate simulation results for different performance-setting algorithms tested on interactive workloads.
Figure 12B:
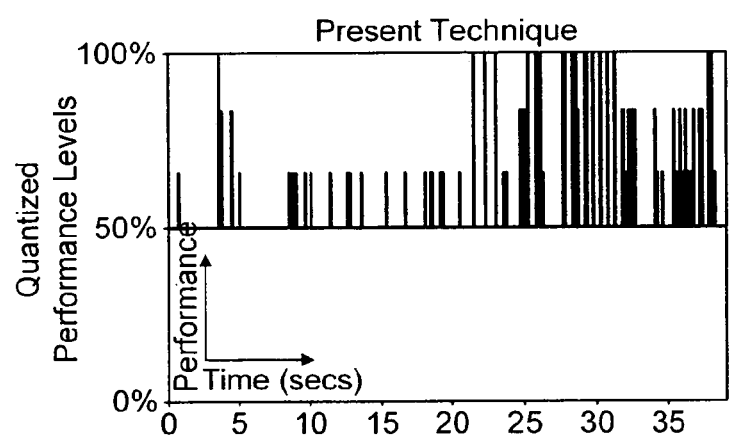
Figure 12C:
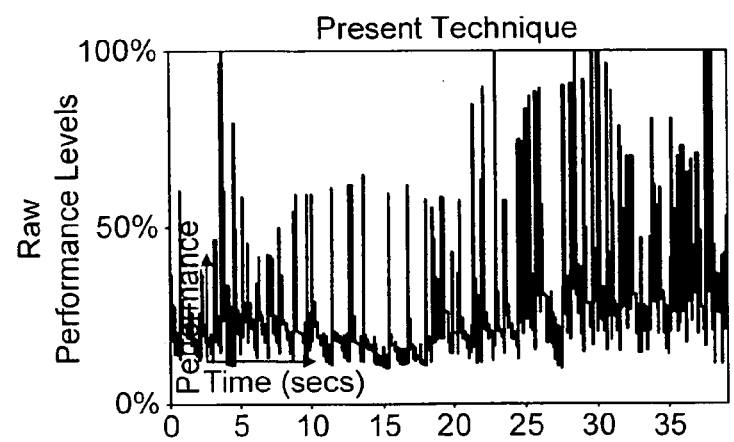

FIG. 12 shows the performance data that was collected during a simulation run for assessment of interactive workloads. FIG. 12A is a graph of percentage performance level against time (in seconds) for the LongRun technique and in this case the plotted results correspond to the actual performance levels of the processor during the measurement. FIG. 12B is a plot of the quantized performance levels whereas FIG. 12C is a plot of the raw performance levels as a function of time that the performance-setting algorithm of the present technique would have set, had it been in control of the processor. Note that if the algorithm of the present technique had in fact been in control, its performance-setting decisions would have had a different run-time impact from those made by LongRun. For this reason the time axes on the graphs of FIGS. 12B and 12C should be regarded as approximations.

To get around the time-skew problem in the statistics, the passive performance-level traces of the simulations according to the present technique were post-processed to assess the impact of the increased execution times that would have resulted from the use of the present technique instead of LongRun. Rather than looking at the entire performance-level trace, only on the interactive episodes were focussed on. The interactive performance-setting algorithm of the present technique, it includes functionality for finding durations of execution that have a direct impact on the user. This technique gives valid readings regardless of which algorithm is in control and was thus used to focus our measurements. Once the execution range for an interactive episode had been isolated, the full-speed equivalent work done during the episode was computed for both LongRun and the present technique. Since during the measurement LongRun is in control of the CPU speed and it runs faster than it would do if the resent technique were in control, the episode duration of results corresponding to the present technique must be lengthened. First, the remaining work is computed for the present technique according to the following formula:

$$Work_{Present\ technique\ Remaining} = Work_{LongRun} - Work_{Present\ technique}$$

Next, the algorithm computed to what extent the length of the interactive episode needed to be stretched—assuming that the algorithm of the present technique continued to run at its predicted speed until it reached the panic threshold, at ran at full-speed after that. The statistics were adjusted accordingly. It was found that the results using this technique were close to what we observed on similar workloads (same benchmark but with a slightly different interactive load) running with the algorithm according to the present technique in active control of the processor. However, when the algorithm according to the present technique was actually in control, the number of performance-setting decisions was reduced and the performance-levels were more accurate.

FIG. 13 shows the statistics gathered using the above-described time-skew correction technique. Each of the six graphs in the figure graph comprises two stacked columns. The left-hand column on each graph relates to LongRun whereas the right-hand column relates to the present technique. Each column is stacked so as to represent the fraction of time spent in interactive episodes at each of the four performance levels supported in the computer. These performance levels—from bottom up—are from 300 Mhz to 600 Mhz at 100 Mhz increments. Even from a high level, it is apparent that the algorithm according to the present technique spends more time at lower performance levels than LongRun does. On some benchmarks such as Emacs, there is hardly ever a need to go fast and the interactive deadlines are met while the machine stays at its lowest possible performance level. At the other end of the spectrum is the Acrobat Reader benchmark, which exhibits bimodal behaviour: the processor either runs at its peak level or at its minimum. Even on this benchmark many of the interactive episodes can complete in time at the minimum performance level of the processor. However, when it comes to rendering the pages, the peak performance level of the processor is not sufficient to complete its deadlines within the user perception threshold. Thus, upon encountering a sufficiently long interactive episode, the algorithm according to the present technique switches the processor performance-level to its peak. By way of contrast, during the run of the Konqueror benchmark, the algorithm according to the present technique can take advantage of all four available performance levels of the processor. This can be compared with the LongRun strategy, which causes the processor to spend most of its time at the peak level.

Overall, the simulation results detailed above with reference to FIGS. 8 to 13, have shown how two performance-setting policies implemented at different levels in the software hierarchy behave on a variety of multimedia and interactive workloads. It was found that the Transmeta LongRun power manager, which is implemented in the processor's firmware, makes more conservative choices than the algorithm according to the present technique, which is implemented in the kernel of the operating system. On a set of multi-media benchmarks an 11% to 35% average performance level reduction was achieved by the algorithm according to the present technique over that achieved using the known LongRun technique.

Since the performance-setting algorithm according to the present technique is implemented higher in the software stack than LongRun it is able to make decisions based on a richer set of run-time information, which in turn translates into increased accuracy.

Although the firmware approach of LongRun was shown to be less accurate than an algorithm implemented in the kernel, it does not diminish its usefulness. LongRun has the crucial advantage of being operating system agnostic. It is recognised that the gap between low and high level implementations could be bridged by to providing a baseline performance-setting algorithm such as LongRun in firmware and exposing an interface to the operating system for the purpose of (optionally) refining processor performance-setting decisions. The hierarchy of performance-setting algorithms according to the present technique provides a mechanism to support such design. The bottom-most performance-setting policy on the stack could actually be implemented in the firmware of the processor.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus being operable to perform processing work at a variable rate of work and comprising:

a performance counter operable to add a work increment value to an accumulated work done value to accumulate a work done value indicative of an amount of processing work performed by said apparatus; and a clock signal generator operable to generate a clock signal to drive processing operations of said apparatus, said clock signal having a variable frequency, wherein said word increment value is variable so as to represent said variable rate of work and said work in increment value is dependent upon a clock signal frequency value at or close to a time that the accumulated work done value is incremented.

2. Apparatus as claimed in claim 1, comprising an increment value adjusting circuit operable to adjust said work increment value in dependence upon said clock signal frequency.

3. Apparatus as claimed in claim 2, wherein said work increment value variable non-linearly with said clock signal frequency.

4. Apparatus as claimed in claim 1, comprising a variable voltage power supply operable to supply electrical power to said apparatus at a plurality of different supply voltages, said clock signal generator being operable to generate higher frequency clock signals at higher supply voltages.

5. Apparatus as claimed in claim 1, wherein said work increment value is programmable under software control.

6. Apparatus as claimed in claim 1, wherein said work increment value is varied with a read-modify-write operation.

7. A method of measuring processing work performed by an apparatus for processing data at a variable rate of work, said method comprising the steps of:

adding a work increment value to an accumulated work done value with a performance counter to accumulate a work done value indicative of an amount of processing work performed by said apparatus;

generating a variable frequency clock signal to drive processing operations of the apparatus, and varying said work increment value dependent upon a frequency value of said clock signal so as to represent said variable rate of work where said frequency value is a frequency value of said clock signal at or as close to a time that the accumulated work done value is incremented.

8. A method as claimed in claim 7, comprising adjusting said work increment value in dependence upon said clock signal frequency.

9. A method as claimed in claim 8, wherein said work increment value variable non-linearly with said clock signal frequency.

10. A method as claimed in claim 7, comprising supplying electrical power to said apparatus at a plurality of different supply voltages and generating higher frequency clock signals at higher supply voltages.

11. A method as claimed in claim 7, wherein said work increment value is programmable under software control.

12. A method as claimed in claim 7, wherein said work increment value is varied with a read-modify-write operation.

* * * * *